(12) United States Patent
Monteuuis et al.

(10) Patent No.: US 11,402,460 B2
(45) Date of Patent: Aug. 2, 2022

(54) METHOD AND SYSTEM FOR PROCESSING A SIGNAL TRANSMITTED TO A MOTOR VEHICLE BY A REMOTE COMMUNICATING ENTITY

(71) Applicants: PSA AUTOMOBILES SA, Poissy (FR); INSTITUT MINES-TÉLÉCOM, Paris (FR)

(72) Inventors: Jean Philippe Monteuuis, Levallois Perret (FR); Stefano Mafrica, Boulogne Billancourt (FR); Alain Servel, Jouy en Josas (FR); Houda Labiod, Montrouge (FR); Jun Zhang, Paris (FR)

(73) Assignees: PSA AUTOMOBILES SA, Poissy (FR); INSTITUT MINES-TÉLÉCOM, Paris (FR)

( * ) Notice: Subject to any disclaimer, the term of this patent is extended or adjusted under 35 U.S.C. 154(b) by 0 days.

(21) Appl. No.: 17/601,838

(22) PCT Filed: Apr. 16, 2020

(86) PCT No.: PCT/FR2020/000124
§ 371 (c)(1),
(2) Date: Oct. 6, 2021

(87) PCT Pub. No.: WO2020/217002
PCT Pub. Date: Oct. 29, 2020

(65) Prior Publication Data
US 2022/0091219 A1    Mar. 24, 2022

(30) Foreign Application Priority Data
Apr. 26, 2019 (FR) ..................................... 1904472

(51) Int. Cl.
*G01S 5/02* (2010.01)
*H04B 17/27* (2015.01)
*H04B 17/318* (2015.01)

(52) U.S. Cl.
CPC .......... *G01S 5/0244* (2020.05); *G01S 5/0284* (2013.01); *H04B 17/27* (2015.01); *H04B 17/318* (2015.01)

(58) Field of Classification Search
CPC ... H04L 63/08; H04L 63/0428; H04L 63/126; H04L 63/1416; H04L 63/1441;
(Continued)

(56) References Cited

U.S. PATENT DOCUMENTS

| 10,466,700 B1 * | 11/2019 | Carmack ................ H04K 3/224 |
| 2012/0123640 A1 | 5/2012 | Mukaiyama |

(Continued)

FOREIGN PATENT DOCUMENTS

| CN | 1405530 A | * | 3/2003 | ............. G01C 21/28 |
| EP | 2769184 B1 | * | 11/2017 | ......... G01D 5/24461 |

OTHER PUBLICATIONS

"Validity and reliability of GPS and LPS for measuring distances covered and sprint mechanical properties in team sports" by Hoppe et al., dated Feb. 8, 2018 (Year: 2018).*

(Continued)

*Primary Examiner* — Daniel Lai
(74) *Attorney, Agent, or Firm* — Sandberg Phoenix & von Gontard P.C.

(57) ABSTRACT

The invention relates to a method for processing, by a computer system (100) installed on board a motor vehicle, a signal transmitted by a remote communicating entity and received by means of a radiofrequency signal communication apparatus arranged inside the vehicle, and to a system implementing such a method and to a motor vehicle com- (Continued)

prising such a system. The aim of the invention is to determine the plausibility of a radiofrequency signal transmitted by a remote communicating entity, in particular a signal that contains data relative to a followed course and/or a geographical position of the vehicle.

7 Claims, 2 Drawing Sheets

(58) Field of Classification Search
CPC ... H04L 63/123; H04L 63/1425; H04L 63/12; H04L 63/1433; H04L 63/1408; H04L 51/38; H04L 9/32; H04L 63/14; G06Q 50/30; H04W 4/02; H04W 12/08; H04W 4/029; H04W 4/40; H04W 4/42; H04W 4/44; H04W 4/46; H04W 4/48; H04W 12/10; G01S 19/215; G01S 5/02; G01S 5/0027; G01S 7/497; G01S 5/0036; G01S 19/08; G01S 19/42; G01S 17/58; G01S 19/24; G01S 5/0236; G01S 19/393; G01S 7/4912; G01S 7/526; G01S 3/043; G01S 2015/937; G01S 5/0244; G01S 5/0284; H04B 17/27; H04B 17/318
See application file for complete search history.

(56) References Cited

U.S. PATENT DOCUMENTS

| | | | |
|---|---|---|---|
| 2015/0203213 A1* | 7/2015 | Levien | G01C 21/00 |
| | | | 701/486 |
| 2017/0365171 A1 | 12/2017 | Haran | |
| 2018/0136008 A1 | 5/2018 | Engel et al. | |
| 2018/0204398 A1 | 7/2018 | Smith | |
| 2018/0210088 A1 | 7/2018 | Okada | |
| 2020/0158877 A1* | 5/2020 | Joosten | G01S 19/20 |

OTHER PUBLICATIONS

International Search Report for PCT/FR2020/000124 dated Jul. 29, 2020.
Written Opinion for PCT/FR2020/000124 dated Jul. 29, 2020.

* cited by examiner

METHOD AND SYSTEM FOR PROCESSING A SIGNAL TRANSMITTED TO A MOTOR VEHICLE BY A REMOTE COMMUNICATING ENTITY

CROSS-REFERENCE TO RELATED APPLICATIONS

This application is the US National Stage under 35 USC § 371 of International Application No. PCT/FR2020/000124, filed 16 Apr. 2020 which claims priority to French Application No. 1904472 filed 26 Apr. 2019, both of which are incorporated herein by reference.

TECHNICAL FIELD

The present invention relates to the field of driving assistance systems for motor vehicles. The invention relates in particular to a method for processing, by a computer system installed on board a motor vehicle, of a signal transmitted by a remote communicating entity and received by means of a radiofrequency signal communication apparatus arranged inside the vehicle. The invention also relates to a computer system implementing such a method. The invention applies in particular to autonomous and connected motor vehicles.

BACKGROUND

It is known that autonomous vehicles are called upon to move within intelligent transport systems that are under development and/or being deployed and within which vehicles will have to use communication techniques in order to be able to interact with various communicating entities, for example infrastructure, other vehicles, or mobile communication devices carried by pedestrians (e.g. smartphones). These communication techniques are indeed essential in order to provide autonomous driving functionalities because autonomous vehicles will in particular use them to determine a perception of the environment that surrounds them; to do this, they use signals that will be transmitted to them by the various communicating entities. It is therefore understood that the processing of these signals, which will determine the perception of autonomous vehicles and which will most often be carried out by the autonomous vehicles themselves, is essential when one wishes to provide reliable autonomous driving functionalities in order to maximize the safety of road users. Therefore, one of the first needs that car manufacturers must meet concerns the implementation of techniques which make it possible to determine, when a signal is received, whether the signal can be qualified as safe, in which case its content should be taken into account to provide driver assistance features, or if the signal is potentially corrupted, in which case it should not be taken into account to provide driver assistance features.

To meet this fundamental need, driving assistance systems which implement signal processing methods to verify the integrity of the received signals have been developed. There are in particular methods implemented by motor vehicle driving assistance systems that rely on cryptography techniques to verify the authenticity and/or integrity of a received signal that has been transmitted by a remote communicating entity. Unfortunately, these methods are of no help when it comes to verifying, beyond the authenticity and integrity of a signal, that its content is in phase with a particular driving context, in particular with respect to a geographical position of a vehicle and/or a course that it follows.

Also, with respect to this particular information, which may form part of the content of a signal transmitted to an autonomous and connected vehicle by a remote communicating entity, other driving assistance systems that implement other signal processing techniques so as to determine the plausibility of a received signal, for example that described in US20170365171, have been developed. However, these systems generally limit themselves to using a particular technique for processing the radiofrequency signals, but they generally do not provide for any particular mechanism to limit processing errors. In other words, the systems that are currently available are limited to concluding on the plausibility of a received signal based on the verification of a single condition that is determined by the radiofrequency signal processing technique used. For example, some current systems implement signal processing techniques that make it possible to verify only geographical position information contained in a signal. Therefore, using such systems, when a received signal contains correct position information but also contains incorrect course information, the signal is considered plausible when in reality it is not. This therefore induces a risk of seeing a corrupted message taken into account, which is extremely regrettable because, although it may not be too bothersome for a corrupted radiofrequency signal to be taken into account when it concerns the transmission of a video, in the context of autonomous driving, it is crucial to minimize the risk of such a situation occurring as much as possible. Indeed, taking a corrupted signal into account in the context of providing autonomous driving assistance functionalities can induce disastrous consequences that can potentially endanger the lives of road users.

Furthermore, there is also another risk in relying on a single signal processing technique, which is due to the known shortcomings of conventional radiofrequency signal processing techniques. It is in fact known that all the techniques for processing radiofrequency signals unfortunately have drawbacks, and in the context of autonomous driving, these can be particularly troublesome. For example, techniques based on the angle of arrival of signals suffer from the problem of constant movement between autonomous vehicles. Similarly, techniques based on the power of signals (e.g. RSSI) are subject to the constraints of attenuation and the realism of the models available to estimate the power of a received signal. Similarly, techniques based on signal arrival time also suffer from signal propagation conditions and the realism of the models used.

SUMMARY

The invention aims to provide a method for overcoming these drawbacks. To this end a method and a system are disclosed that make it possible to better minimize the probability of seeing a corrupted signal taken into account to provide driving assistance functionalities. More specifically, the method and system makes it possible to determine the plausibility of a radiofrequency signal transmitted by a remote communicating entity, in particular a signal that contains data relating to a followed course and/or a geographical position.

These aims are achieved by means of a method for processing, by a computer system installed on board a motor vehicle, of a signal transmitted by a remote communicating entity and received by means of a radiofrequency signal communication apparatus arranged inside the vehicle, the method comprising the steps of:

- determining, by using the signal, at least one characteristic parameter of the signal and data characterizing a piece of content of the signal,
- acquiring measurement data generated using a detection device arranged inside the vehicle, a vehicle navigation system configured to interact with a satellite positioning system, and/or the radiofrequency signal communication apparatus,
- determining a value of a first primary plausibility parameter) relative to a course followed by the vehicle using the characteristic parameter of the signal, the data characterizing a piece of content of the signal, and the measurement data,
- determining a value of a second primary plausibility parameter relative to a geographical position of the vehicle as a function of a value of a first secondary plausibility parameter and of a value of a second secondary plausibility parameter that have been determined, for the value the first secondary plausibility parameter, using the characteristic parameter of the signal, and for the value of the second secondary plausibility parameter, using the data characterizing a piece of content of the signal and the measurement data, and
- if the value of the first primary plausibility parameter and the value of the second primary plausibility parameter are identical, controlling the storing of the data characterizing a piece of content of the signal on a data storage medium arranged in the vehicle so that they can be used by a driving assistance system of the vehicle to provide a driver assistance functionality, or, if the value of the first primary plausibility parameter and the value of the second primary plausibility parameter are different, establishing that the signal should be ignored.

According to one variation, the characteristic parameter of the signal can comprise an angular value, the data characterizing a piece of content of the signal can comprise data characterizing a course established by the communicating entity, the measurement data can comprise data characterizing a measured longitudinal axis and data characterizing a measured course, and the step comprising determining a value of a first primary plausibility parameter can comprise the steps of:

- using the angular value at the measured longitudinal axis to determine a first angle,
- using the course established by the communicating entity and the measured course to determine a second angle, and
- if the difference between the first angle and the second angle is less than or equal to a first preset threshold value, assigning a first preset plausibility value to the first primary plausibility parameter, or, if the difference between the first angle and the second angle is greater than the first threshold value, assigning a second plausibility value to the first primary plausibility parameter.

According to another variation, the characteristic parameter of the signal can comprise a measured power value and the step comprising determining a value of a second primary plausibility parameter can comprise the steps of:

- determining a theoretical power value using a modeling module,
- determining the difference between the measured power value and the theoretical power value, and
- if the difference between the measured power value and the theoretical power value is less than or equal to a second preset threshold value, assigning a first preset plausibility value to the first secondary plausibility parameter, or, if the difference between the measured power value and the theoretical power value is greater than the second preset threshold value, assigning a second preset plausibility value to the first secondary plausibility parameter.

According to another variation, the data characterizing a content of the signal can comprise data characterizing a transmission duration of the signal and data characterizing a geographical position established by the communicating entity, the measurement data can comprise a reception duration of the measured signal and data characterizing a measured geographical position and the step consisting in determining a value of a second primary plausibility parameter can comprise the steps of:

- determining a first distance value using the signal transmission duration, the duration of the measured signal reception and a propagation speed value,
- determining a second distance value using the geographical position established by the communicating entity and the measured geographical position,
- determining the difference between the first distance value and the second distance value, and
- if the difference between the first distance value and the second distance value is less than or equal to a third preset threshold value, assigning a first plausibility value to the second secondary plausibility parameter, or, if the difference between the first distance value and the second distance value is greater than the third preset threshold value, assigning a second plausibility value to the second secondary plausibility parameter.

A further object of the invention is a processing system that can be installed on board a motor vehicle and can process a signal transmitted by a remote communicating entity and received by means of a radiofrequency signal communication apparatus arranged inside the vehicle, the processing system comprising at least one information processing unit, comprising at least one processor, and a data storage medium configured to implement a method as described above.

A further object of the invention is a program for executing the steps of a method as described above when said program is executed on a computer.

A further subject of the invention is a medium which can be used in a computer on which a program as described above is recorded.

Finally, one object of the invention is a motor vehicle comprising a system as described above.

BRIEF DESCRIPTION OF THE FIGURES

Other features and advantages of the invention will become apparent on examination of the detailed description that follows and from the appended drawings, in which.

DETAILED DESCRIPTION OF THE INVENTION

Figure 1:
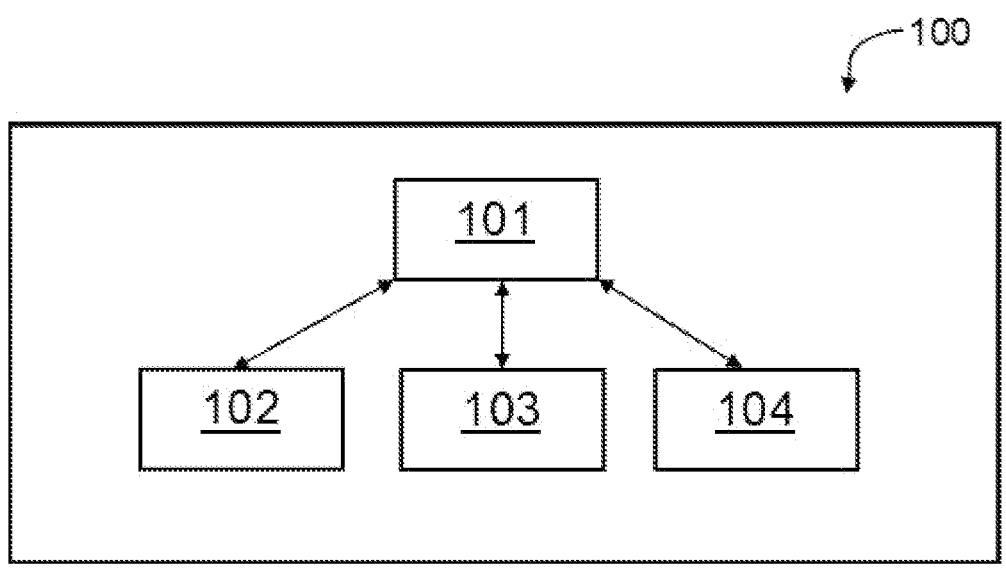
FIG. 1 is a functional diagram of a processing system according to the invention.

A processing system 100 allowing a signal transmitted by a remote communicating entity to be processed is a computer system, shown in FIG. 1, comprises an information processing unit 101, comprising one or more processors, a data storage medium 102, at least one input and output interface 103 allowing data (or signals) to be received and allowing data (or signals) to be transmitted, and, optionally, a digital signal processor 104 capable of receiving, demodulating and amplifying data in accordance with the general knowledge of those skilled in the art.

According to certain embodiments, the processing system 100 is installed in a motor vehicle and it is hosted on one or more of the computers, electronic control units and other telematics boxes of the vehicle. According to other embodiments, the processing system 100 is hosted on a computer that is independent of a motor vehicle and it interacts through its input and output interface 103 with a computer of a driving assistance system of the vehicle. According to the preferred embodiment, the processing system 100 forms an integral part of a computer for a driving assistance system of a motor vehicle. Therefore, whatever the embodiment, the processing system 100 is always able to interact, through its input and output interface 103, not only with the driving assistance system of the vehicle, but also with any other system and/or equipment of the vehicle that, from time to time, periodically and/or continuously, is called upon to act in conjunction with the vehicle's driving assistance system.

Conventionally, the driving assistance system of the vehicle is based on a plurality of detection devices arranged in the vehicle and on one or more dedicated logic controllers, computers and/or processors, which, according to preset roles and as a function of signals and/or data generated by detection devices, can control the operation of certain components of the vehicle to help provide various driving assistance functions (e.g. emergency braking assistance, obstacle avoidance assistance, lane keeping assistance, parking assistance, etc.). For example, the driving assistance system comprises at least one laser remote sensing device, a radio detection device, a camera, an ultrasonic sensor, a compass and/or an inertial unit, each of these detection devices preferably comprising a signal processing module capable of generating data on the basis of received signals. Alternatively or cumulatively, the driving assistance system comprises a central signal processing module that is capable of generating data based on signals emitted by each of the detection devices.

Furthermore, to implement certain tasks relating to certain steps of the method, the driving assistance system is also provided with interfaces and other dedicated hardware and software elements that allow it to interact with other vehicle equipment that is used to interact within intelligent transport systems. Such equipment in particular comprises a radiofrequency signal communication apparatus arranged in the vehicle with which the driving assistance system can interact to exchange data with other components of an intelligent transport system (e.g. road infrastructure, remote data sources, other vehicles, electronic devices worn by pedestrians, etc.) and/or a smartphone in the vehicle. Using these means, the driving assistance system, and therefore the processing system 100 that interacts with it or that forms an integral part thereof, is able to obtain signals transmitted by communicating entities and received using the radiofrequency signal communication apparatus.

In addition, to implement other tasks relating to other steps of the method, the driving assistance system comprises dedicated hardware and software for interacting with a navigation system of the vehicle, which conventionally comprises a receiver interacting with a satellite positioning system. Using these hardware and software, the driving assistance system, and therefore the processing system 100 that interacts with it or that forms an integral part thereof, is able to obtain data from the navigation system, in particular measurement data relating to a course followed by the vehicle and/or to a geographical position of the vehicle (e.g. GPS coordinates).

Figure 2:
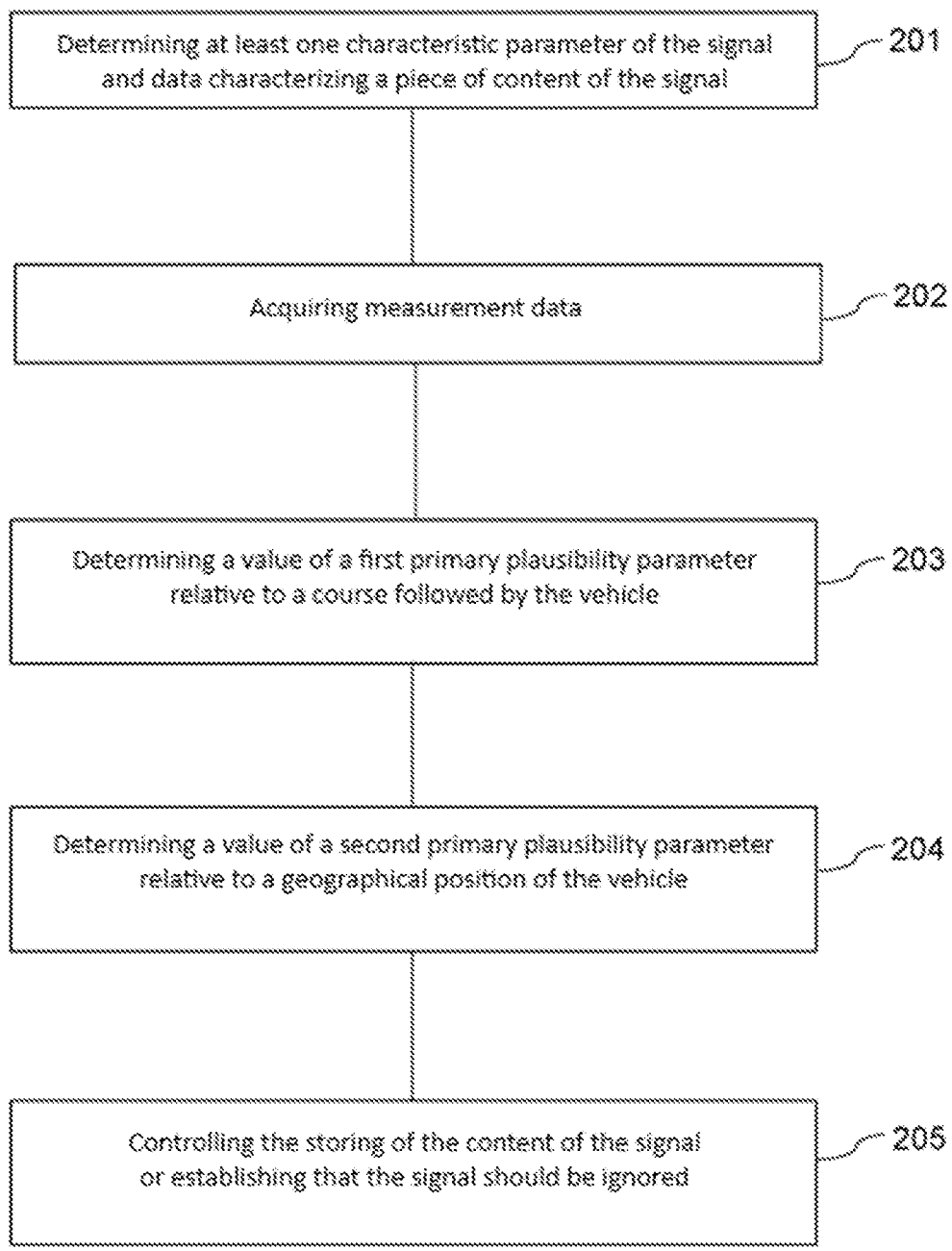
FIG. 2 is a flowchart illustrating certain steps of a processing method according to the invention.

All the elements described above contribute to allowing the processing system 100 to implement a method for processing a signal transmitted by a remote communicating entity and received by means of a radiofrequency signal communication apparatus, as described below in connection with FIG. 2.

According to a first step 201 of the method, the processing system 100 uses the received signal to determine at least one characteristic parameter of the signal and data characterizing a piece of content of the signal. Depending on the case, the characteristic parameter of the signal thus determined can comprise an angular value, corresponding for example to the angle of arrival of the signal, and a power value corresponding, for example, to a power value of the measured signal (e.g. RRSI). Furthermore, the data characterizing a piece of content of the signal may comprise data characterizing a course followed by the vehicle established by the communicating entity, data characterizing a transmission duration of the signal and data characterizing a geographical position of the vehicle established by the communicating entity.

Then, according to a second step 202 of the method, the processing system 100 acquires (i.e. extracts and/or receives) measurement data generated by using a detection device of the driving assistance system, the navigation system of the vehicle and/or the radiofrequency signal communication apparatus. Depending on the case, these measurement data may comprise data characterizing a measured longitudinal axis and/or a measured course, these data being determined using, for example, a compass of the driving assistance system and/or the navigation system of the vehicle. In other cases, the measurement data may comprise data characterizing a signal reception duration measured using the radiofrequency signal communication apparatus and/or data characterizing a geographical position measured using the vehicle's navigation system.

Then, according to a third step 203 of the method, the processing system 100 determines a value of a first primary plausibility parameter (PPP1) relative to a course followed by the vehicle by using a characteristic parameter of the signal, the data characterizing a piece of content of the signal that was determined during the first step 201, and the measurement data that were acquired during the second step 202.

According to one example, the processing system 100 does this by using an angular value that corresponds to the angle of arrival of the radio signal determined during the first step 201 and the longitudinal axis of the vehicle contained in the measurement data acquired during step 202 in order to determine a value of a first angle (A1). Then, the processing system 100 uses the course established by the communicating entity determined during the first step 201 and the measured course acquired during the second step 202 in order to determine a value of a second angle (A2). Finally, the processing system 100 determines the difference (DeltaA) between the first angle and the second angle and, if the difference between the first angle and the second angle is less than or equal to a first preset threshold value (TV1), the processing system 100 assigns a first value plausibility preset (PPV1) to the first primary plausibility parameter, for example a first Boolean value chosen to characterize a plausible nature. That is, if DeltaA TV1, then PPP1=PPV1. On the contrary, if the difference between the first angle and the second angle is greater than the first threshold value, the processing system 100 assigns a second plausibility value to the first primary plausibility parameter, for example a Boolean value chosen to characterize an improbable nature. That is, if DeltaA>TV1, then PPP1=PPV2.

Then, according to a fourth step 204 of the method, the processing system 100 determines a value of a second primary plausibility parameter (PPP2) relative to a geographical position of the vehicle as a function of a value of a first secondary (SPP1) plausibility parameter and a value of a second secondary plausibility parameter (SPP2). That is, PPP2=f(SPP1, SPP2). Preferably, the value of the first secondary plausibility parameter (SPP1) is determined using the characteristic parameter of the signal (SP) determined during the first step 201, while the value of the second secondary plausibility parameter (SPP2) is determined using the data (SC) characterizing a piece of content of the signal determined during the first step 201 and the measurement data (MD) acquired during the second step 202. That is, SPP1=f(SP) and SPP2=f(SC, MD). In addition, advantageously, the processing system 100 assigns the first plausibility value (PV1, i.e. plausible) to the second primary plausibility parameter (PPP2) when the value of the first secondary plausibility parameter (SPP1) and the value of the second secondary plausibility parameter (SPP2) are identical. That is, if SPP1=SPP2, then PPP2=PV1. On the contrary, the processing system 100 assigns the second plausibility value (PV2, i.e. improbable) to the second primary plausibility parameter (PPP2) when the value of the first secondary plausibility parameter and the value of the second secondary plausibility parameter are different. That is, if SPP1≠SPP2, then PPP2=PV1.

According to one example, to determine the value of the first secondary plausibility parameter, the processing system 100 first determines a theoretical power value using a modeling module. Then, the processing system 100 determines the difference between the measured power value that was determined in step 201 and the theoretical power value. Finally, if the difference between the measured power value and the theoretical power value is less than or equal to a second preset threshold value, the processing system 100 assigns the first preset plausibility value (i.e. plausible) to the first secondary plausibility parameter. On the contrary, if the difference between the measured power value and the theoretical power value is greater than the second preset threshold value, the processing system 100 assigns the second preset plausibility value (i.e. improbable) to the first secondary plausibility parameter.

According to another example, to determine the value of the second secondary plausibility parameter, the system first determines a first distance value based on the transmission duration of the signal determined during the first step 201, on the reception duration of the signal acquired during the second step 202, and on a preset propagation speed value. Then, the processing system 100 determines a second distance value using the geographical position established by the communicating entity determined during the first step 201 and the measured geographical position acquired during the second step 202. Finally, the processing system 100 determines the difference between the first distance value and the second distance value and, if the difference between the first distance value and the second distance value is less than or equal to a third preset threshold value, the processing system 100 assigns the first plausibility value (i.e. plausible) to the second secondary plausibility parameter. On the contrary, if the difference between the first distance value and the second distance value is greater than the third preset threshold value, the processing system 100 assigns the second plausibility value (i.e. improbable) to the second secondary plausibility parameter.

Finally, according to a fifth step 205 of the method, when the value of the first primary plausibility parameter and the value of the second primary plausibility parameter are identical, the processing system 100 controls the storing of the data characterizing a piece of content of the signal on a data storage medium arranged in the vehicle so that they can be used by a driving assistance system of the vehicle to provide a driver assistance functionality. On the contrary, when the value of the first primary plausibility parameter and the value of the second primary plausibility parameter are different, the processing system 100 determines that the signal should be ignored.

Consequently, under the terms of the method and of the system according to the method described above, the functional blocks are provided in order to better minimize the probability of seeing a corrupted signal taken into account to provide driving assistance functionalities. Indeed, owing to the various verification mechanisms that are implemented, which take into account several characteristics of the received signal as well as its content, the method and the system described above contribute to allowing an autonomous and connected vehicle to more reliably determine whether a received signal is plausible or corrupt, in particular a signal that contains data relating to a followed course and/or to a geographical position.

The invention claimed is:

1. A method for processing, by a computer system installed on board a motor vehicle, of a signal transmitted by a remote communicating entity and received by means of a radiofrequency signal communication apparatus arranged inside the vehicle, wherein the method comprises the steps of:

determining, by using the signal, at least one characteristic parameter (SP) of the signal and data (SC) characterizing a piece of content of the signal, acquiring measurement data (MD) generated using at least one of a detection device arranged inside the vehicle, a vehicle navigation system configured to interact with a satellite positioning system, and the radiofrequency signal communication apparatus, determining a value of a first primary plausibility parameter ($V_{PPP}$) relative to a course followed by the vehicle, the value of the first primary plausibility parameter being determined as a function of the characteristic parameter (SP) of the signal, the data (SC) characterizing a piece of content of the signal, and the measurement data (MD), determining a value of a first secondary plausibility parameter ($V_{SPP1}$) and a value of a second secondary plausibility parameter ($V_{SPP2}$), wherein the value of the first secondary plausibility parameter is determined as a function of the characteristic parameter of the signal (SP), and the value of the second secondary plausibility parameter being determined as a function of the data (SC) characterizing a piece of content of the signal and the measurement data (MD), determining a value of a second primary plausibility parameter ($V_{SPP}$) relative to a geographical position of the vehicle, the value of the second primary plausibility parameter being determined as a function of the value of a first secondary plausibility parameter ($V_{SPP1}$) and of the value of a second secondary plausibility parameter ($V_{SPP2}$), wherein, if the value of the first primary plausibility parameter ($V_{PPP1}$) and the value of the second primary plausibility parameter ($V_{SPP1}$) are identical, the method comprises controlling the storing of the data characterizing a piece of content of the signal on a data storage medium arranged in the vehicle so that the data can be used by a driving assistance system of the vehicle to provide a driver assistance functionality, otherwise, if the value of the first primary plausibility parameter ($V_{PPP}$) and the value of the second primary plausibility parameter ($V_{SPP}$) are different, establishing that the signal should be ignored.

2. The method according to claim 1, wherein the characteristic parameter of the signal comprises an angular value, the data characterizing a piece of content of the signal comprise data characterizing a course established by the communicating entity, the measurement data comprising data characterizing a measured longitudinal axis and data characterizing a measured course, and the step of determining a value of a first primary plausibility parameter comprises the steps of:
- using the angular value at the measured longitudinal axis to determine a first angle,
- using the course established by the communicating entity and the measured course to determine a second angle, and
- if the difference between the first angle and the second angle is less than or equal to a first preset threshold value, assigning a first preset plausibility value to the first primary plausibility parameter, or, if the difference between the first angle and the second angle is greater than the first threshold value, assigning a second plausibility value to the first primary plausibility parameter.

3. Method according to claim 1, wherein the characteristic parameter of the signal comprises a measured power value and the step comprising determining a value of a second primary plausibility parameter comprises the steps of:
- determining a theoretical power value using a modeling module,
- determining the difference between the measured power value and the theoretical power value, and
- if the difference between the measured power value and the theoretical power value is less than or equal to a second preset threshold value, assigning a first preset plausibility value to the first secondary plausibility parameter, or, if the difference between the measured power value and the theoretical power value is greater than the second preset threshold value, assigning a second preset plausibility value to the first secondary plausibility parameter.

4. Method according to claim 1, wherein the data characterizing a piece of content of the signal comprise data characterizing a transmission duration of the signal and data characterizing a geographical position established by the communicating entity, the measurement data comprising a reception duration of the measured signal and data characterizing a measured geographical position, and the step of determining a value of a second primary plausibility parameter comprises the steps of:
- determining a first distance value using the signal transmission duration, the measured signal reception duration and a propagation speed value,
- determining a second distance value using the geographical position established by the communicating entity and the measured geographical position,
- determining the difference between the first distance value and the second distance value, and
- if the difference between the first distance value and the second distance value is less than or equal to a third preset threshold value, assigning a first plausibility value to the second secondary plausibility parameter, or, if the difference between the first distance value and the second distance value is greater than the third preset threshold value, assigning a second plausibility value to the second secondary plausibility parameter.

5. A processing system able to be installed on board a motor vehicle and adapted to process a signal transmitted by a remote communicating entity and received by means of a radiofrequency signal communication apparatus arranged inside the vehicle, wherein the processing system comprises at least one information processing unit, comprising at least one processor, and a data storage medium configured to implement a method according to claim 1.

6. A motor vehicle, comprising a system according to claim 5.

7. A non-transitory medium usable in a computer, wherein a computer program is recorded therein; said comprising program comprising instructions for executing the steps of a method according to claim 1 when said program is executed on a computer.

* * * * *